United States Patent [19]

Winter

[11] Patent Number: 4,770,592

[45] Date of Patent: Sep. 13, 1988

[54] TRANSPORT TRUCK FOR VEHICLES

[76] Inventor: Charles M. Winter, 2580 W. Philadelphia St., York, Pa. 17404

[21] Appl. No.: 61,819

[22] Filed: Jun. 15, 1987

[51] Int. Cl.$^4$ .............................................. B60P 1/34
[52] U.S. Cl. .................................. 414/477; 414/494; 414/500
[58] Field of Search ............... 414/471, 477, 478, 494, 414/500

[56] References Cited

U.S. PATENT DOCUMENTS

| | | |
|---|---|---|
| 3,430,791 | 3/1969 | Moss . |
| 3,485,400 | 12/1969 | Pewthers ............................ 414/477 |
| 3,633,775 | 1/1972 | Pugliese . |
| 3,647,097 | 3/1972 | Skaggs . |
| 4,260,315 | 4/1981 | Bouffard . |
| 4,348,054 | 9/1982 | Shonkwiler et al. ............ 414/477 X |
| 4,456,420 | 6/1984 | Newhard ........................ 414/477 X |

Primary Examiner—Robert J. Spar
Assistant Examiner—Stuart J. Millman
Attorney, Agent, or Firm—C. Hercus Just

[57] ABSTRACT

A truck having a deck unit pivotally connected to the rearward end of a truck chassis rearwardly of the rear wheels, expansible power mechanism connected to the forward end of the deck unit and operable to elevate it to dispose the unit at an acute angle to the horizontal for loading a vehicle onto the deck unit when the rearward end thereof is substantially in engagement with a pavement surface or the like; the improvement comprising a latch mechanism pivotally connected at one end to the deck unit and the other end pivotally interconnectible to the rear wheels, whereby as the power mechanism is expanded to tilt the deck unit as above described, continued expansion operates to compress the conventional springs by which the rear wheels are connected to the chassis and thereby lowers the rearward end of the chassis and, accordingly, lowers the pivot which connects the deck unit to the rear end of the chassis and thereby further decreases the acute angle of the deck unit to the horizontal to facilitate loading vehicles onto the deck unit without interference of the overhanging ends of the vehicle with the surface of the deck unit.

16 Claims, 3 Drawing Sheets

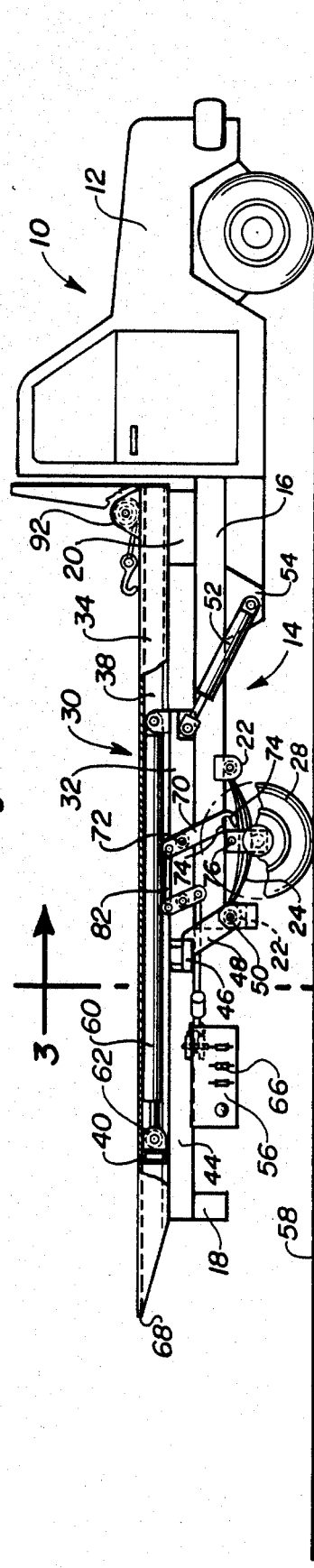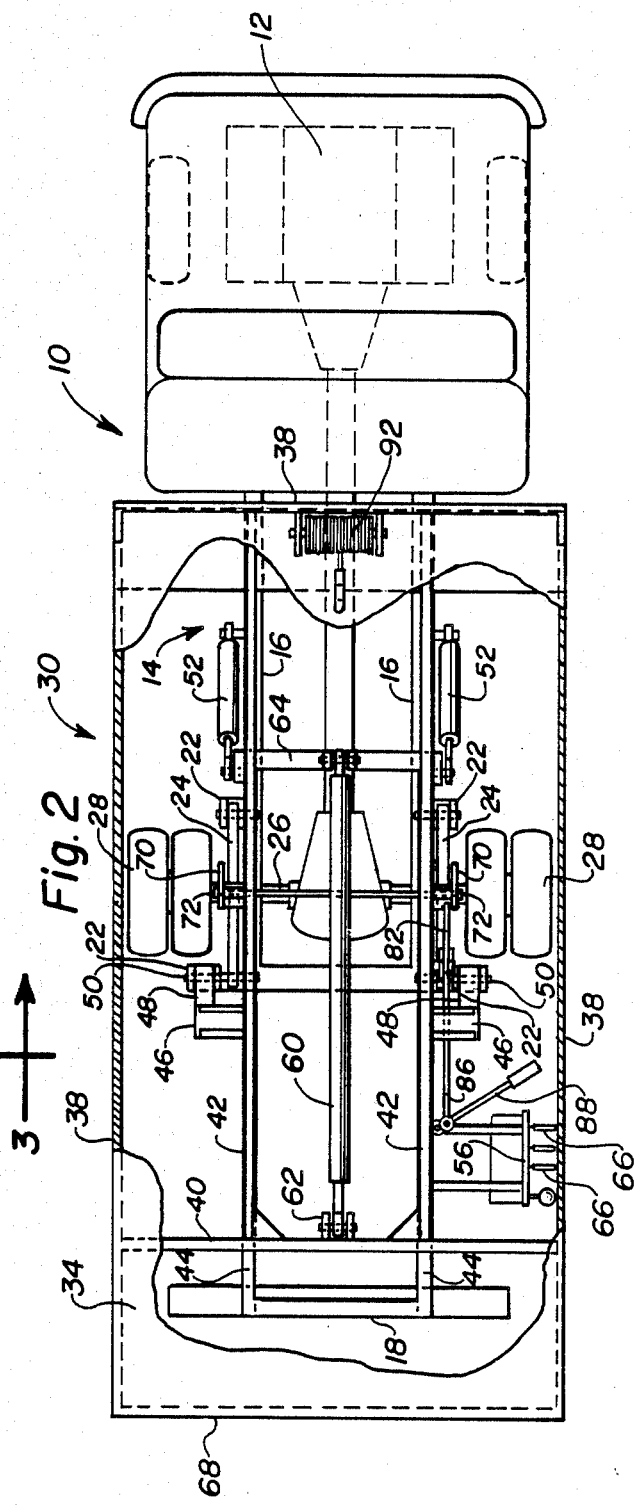

TRANSPORT TRUCK FOR VEHICLES

BACKGROUND OF THE INVENTION

Transporting vehicles such as damaged automobiles and the like, show cars, antique vehicles of various types and other similar transportation of vehicles has become quite popular in recent years and the development of transport trucks to convey such vehicles has been undertaken. Particularly in connection with the loading and conveying of many types of modern automobiles upon the beds of trucks, difficulties have developed especially in regard to loading many types of modern vehicles which have very substantial overhangs of the opposite ends with respect to the vehicles. This has been found to be particularly true with regard to the rear ends of relatively large automobiles and especially those which are low slung, i.e., if the lower surfaces of the opposite ends of the bodies, and especially the rear ends of such bodies, are spaced only a relatively short distance from a road surface upon which the vehicle travels. Accordingly, existing types of transport trucks which have pivoted deck members to receive the vehicles so as to dispose the decks at an acute angle to a pavement or road surface, it has been found in loading such vehicles, and especially by directing the rear end first toward the sloping deck surface of the truck, the lower edge of the body of the vehicle engages the sloping surface of the deck member while the wheels are still on the road surface or the like. This results in a scraping action and sometimes inflicts substantial damage to the vehicle, regardless of whether the vehicle is being loaded under its own power or by means of a winch and cable attached to the bed of the truck.

Various attempts to remedy the foregoing situation have been developed and the following patents are pertinent to illustrate not only the problem involved but also certain attempts to solve the same and thus, prevent damage to so-called low slung vehicles having substantially protruding rear or forward ends of the bodies which extend beyond the adjacent wheels:

U.S. Pat. No. 3,430,791—Moss Mar. 4, 1969
U.S. Pat. No. 3,633,775—Pugliese Jan. 11, 1972
U.S. Pat. No. 3,647,097—Skaggs Mar. 7, 1972
U.S. Pat. No. 4,260,315—Bouffard Apr. 7, 1981

The Skaggs patent, listed above, is representative of a conventional type of tiltable bed truck for having vehicles loaded thereonto while disposed at an acute angle to the pavement surface. The bed is pivoted above the housing for the rear wheels of the truck and elevating the front end thereof is accomplished by means of a fluid-operated cylinder unit 15, 16. It will be seen that the sloping bed 11 is disposed at an angle of about 18° to the horizontal. In loading many types of modern automobiles with substantially protruding ends of the body, such ends will engage the bed 11 while the wheels are still on the horizontal pavement. This presents difficulties in regard to having the vehicle loaded under its own power or, if pulled upon the bed by a winch, damage can be sustained to the vehicle.

The patent to Pugliese discloses a bellows arrangement for permitting the truck bed to be disposed at a very low angle to the horizontal when the bellows is deflated and after loading, the bellows is inflated to dispose the bed of the vehicle at substantially normal elevation upon a road surface or the like.

The patent to Bouffard utilizes a multiple rear wheel assembly connected to the rear end of the chassis of a vehicle by means of vertical hydraulic cylinders at opposite sides, one end of the cylinder units being connected to the flexible, semielliptical spring 18, the opposite ends of the cylinder unit being connected to a connecting member extending between the longitudinally spaced pairs of rear wheels for the vehicle. This represents a form of mechanism which is at least somewhat capable of solving the aforementioned problem and the drawings of the patent actually illustrate one end of a vehicle in phantom disposed in a certain position with respect to the sloping deck of the truck to show a loading problem which is involved.

The present invention provides what is believed to be an improved structure of a transport truck to have vehicles of various kinds loaded thereon and also transport them to desired locations. The invention is applicable to conventional types of transport trucks having tiltable bed units but includes improved means of a very simple nature by which the ultimate angle at which the bed of the vehicle can be disposed and is substantially lower than the lowest angle to which the bed normally can be positioned in the absence of the present invention. Details and advantages of the invention now will be described.

SUMMARY OF THE INVENTION

It is a principal object of the present invention to provide a transport truck for automotive vehicles which has rear wheels connected to the chassis of the vehicle by means of compressible springs, such as semielliptical type or otherwise, the deck unit of the truck being pivotally connected to the rear end of the chassis of the truck and including power means, such as fluid-operated units at opposite sides of the truck, connected between the chassis and the forward portion of the deck unit for purposes of tilting the deck unit to a sloping position at which the rear end is in contact with a pavement, road surface or the like, and the improvement comprising latch mechanism interconnected between the housing of the axles of the rear wheels and a rearward portion of the chassis, whereby when the hydraulic units not only elevate the forward end of the deck unit, but upon continued extension of such fluid-operated units, the latch mechanism causes the rearward end of the chassis to which the pivot of the deck unit is connected, to be lowered by compressing said springs, and thereby decrease the ultimate acute angle to which the bed of the vehicle is disposed with respect to a pavement or roadway, thereby permitting vehicles, which have bodies that overhang the wheels outwardly to substantial extent, to be rolled onto the deck unit of the truck with little or no difficulty as compared to arrangements where the deck unit cannot be disposed at such relatively low angles to the horizontal, and thereby cannot accommodate vehicles with substantial overhang without causing difficulties and possible damage to the vehicle.

Another object of the invention is to, preferably operate the latch mechanism by manual means located at one side of the truck chassis in a convenient location.

A further object of the invention is to form the deck unit of composite nature, including a longitudinal subframe normally parallel to and resting upon the chassis of the truck and a planar deck member slidably disposed upon said subframe and operated in opposite directions by a fluid-operated unit, the invention also including control means preferably located adjacent the aforementioned latch-operating mechanism, and the control means for actuating the fluid-operated units that raise and lower the forward end of the deck unit also having its control mechanism adjacent the aforementioned control and operating elements, all conveniently located adjacent each other at one side of the truck.

Still another object of the invention is to provide latching means in the form of hook-like members respectively pivotally supported at opposite sides of the truck upon the aforementioned subframe of the deck unit and lug means affixed respectively at opposite sides of the truck to the housing for the axles for the rear wheels of the truck, whereby as the fluid-operated members which elevate the forward end of the deck unit are expanded to dispose said unit in a sloping position, continued actuation of said units will cause said springs to be compressed and thereby lower the pivot by which the deck unit is connected to the rear end of the chassis, resulting in a predetermined small angle of slope between the deck unit and the horizontal or a pavement surface or roadway.

Details of the foregoing objects and of the invention, as well as other objects thereof, are set forth in the following specification, and illustrated in the accompanying drawings comprising a part thereof.

BRIEF DESCRIPTION OF THE DRAWINGS

FIG. 1 is a side elevational view of a transport truck for vehicles embodying the principles of the present invention and illustrating the bed unit of the truck in substantially horizontal conveying position and all power means carried by the bed unit are at rest.

FIG. 2 is a plan view of the transport truck shown in FIG. 1 with a substantial portion of the planar deck being removed to expose details of the apparatus affixed to the truck below said surface of the deck member.

DETAILED DESCRIPTION OF THE PREFERRED EMBODIMENTS OF THE INVENTION

Figure 3:
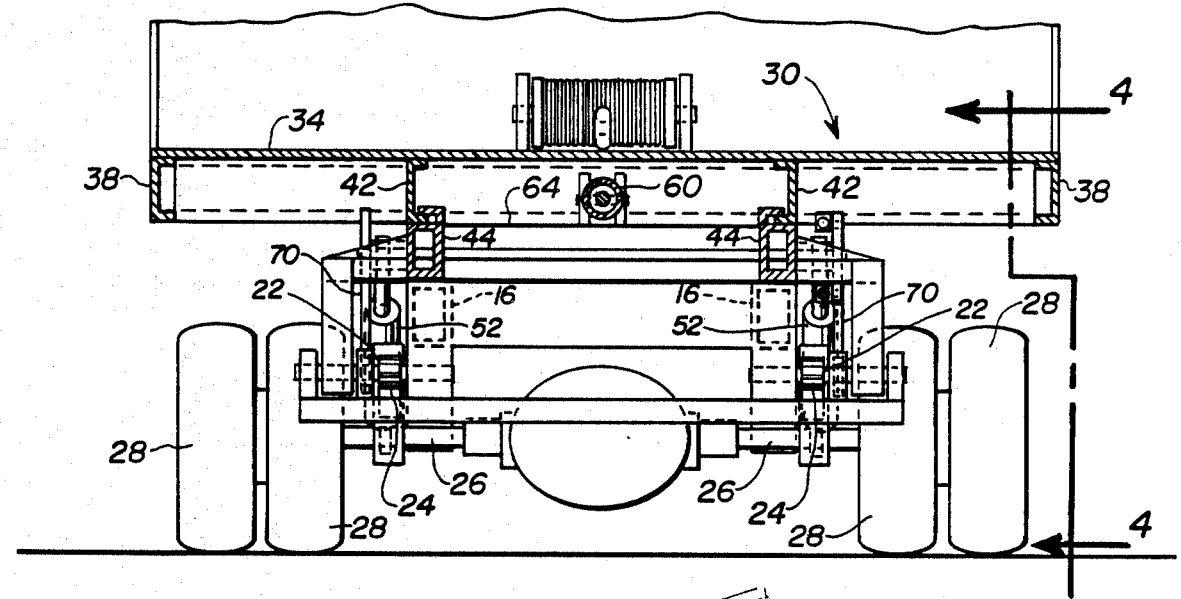
FIG. 3 is a slightly fragmentary and partially sectional vertical elevation of the truck shown in FIGS. 1 and 2, as seen on the line 3—3 of FIG. 1.
Figure 4:
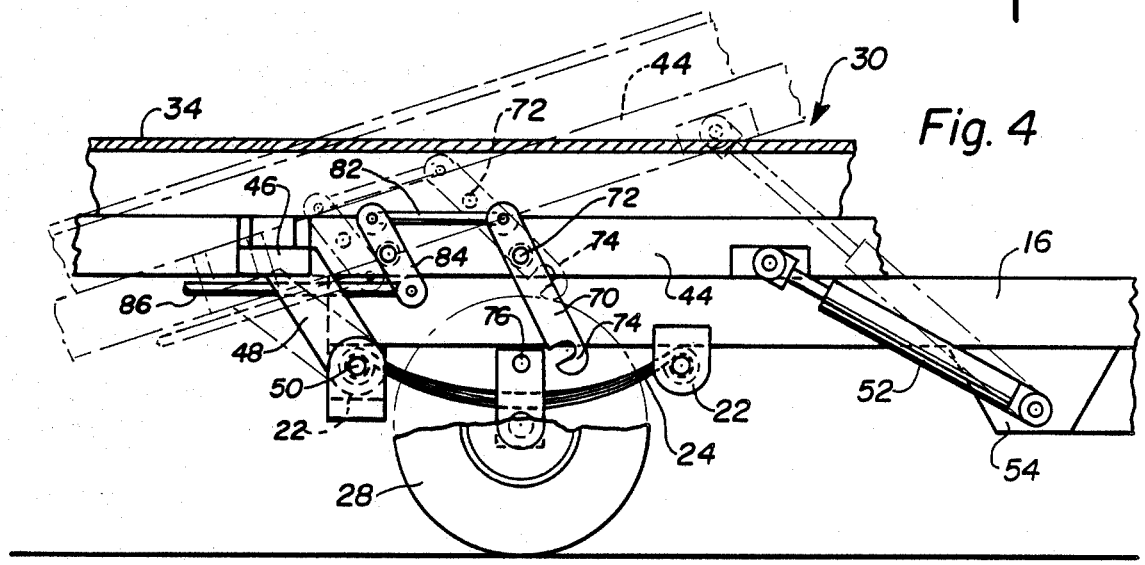
FIG. 4 is a fragmentary side elevation of the transport truck as seen on the line 4—4 of FIG. 3, the deck unit being shown in full lines in substantially horizontal position, while in phantom, said deck means is illustrated at an acute angle to the horizontal as when a vehicle is being loaded thereupon.
Figure 5:
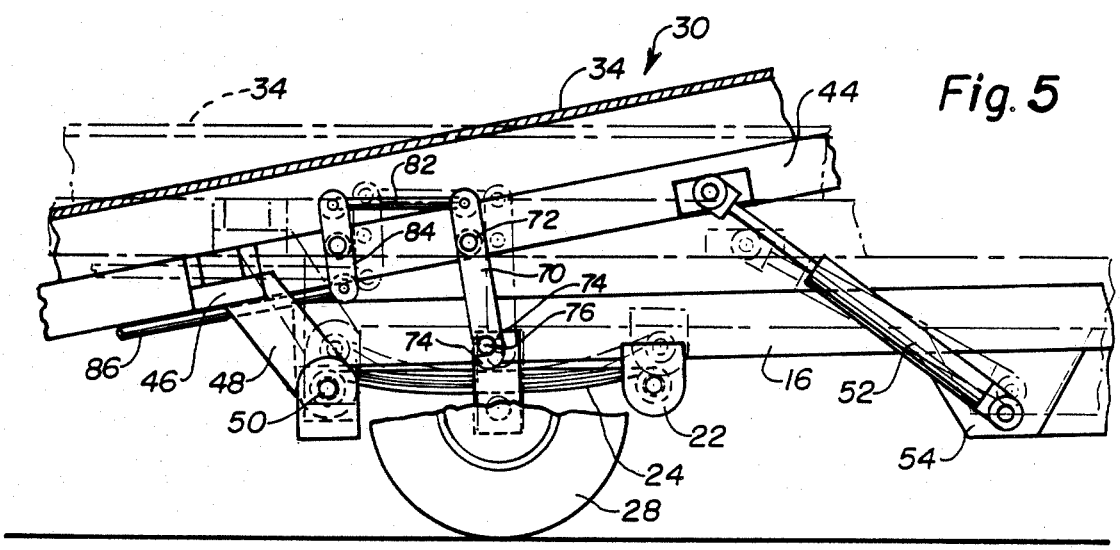
FIG. 5 is a view similar to FIG. 4 except that latch means is shown in disconnected condition in FIG. 4, while in FIG. 5, the latch means is connected and operation of the elevating fluid-operated unit has compressed the springs and thereby lowers the pivot by which the deck unit is connected to the rear end of the chassis of the truck.

Referring to FIGS. 1 and 2, in particular, there is illustrated therein a transport truck 10 having a forward cab and engine cover 12 in the forward portion and a rearwardly extending chassis 14 comprising a pair of parallel channel members 16. The chassis 14 terminates at the rearward end with cross member 18 and a forward cross member 20 extends across the channel members 16 adjacent the cab of the truck.

Depending from the member 16 of the chassis adjacent the rearward portion thereof are shackles 22 to which the opposite end of compressible spring members 24 are connected, the intermediate portions thereof being connected to a transverse housing 26, see FIG. 2, which support the axles to which the wheels 28 are connected, said springs functioning in the normal way to provide resilience between the chassis and the wheels.

A composite bed unit 30, when in normal transport position, is supported upon the channel members 16 of the chassis. The composite bed unit consists of an elongated subframe 32 and a deck member 34. The deck member has an upper planar deck plate affixed to elongated peripheral members 38. Said deck member 34 also has a transverse strut 40 extending between opposite sides of the rear portion of the member and said deck member also has a pair of parallel channel members 42 extending between the transverse strut 40 and the forward peripheral member 38 immediately adjacent the cab. Said channel members 42 are superimposed directly upon similarly spaced, elongated members of the subframe 32, as best shown in FIG. 2, in such superimposed relationship.

Affixed to and extending transversely in opposite directions from the outer surfaces of the elongated channel members 44 of subframe 32, see FIG. 2, are similar lateral members 46, from which diagonal members 48 project and the lower ends thereof are pivotally supported by transverse pins 50 which also extend through one end of the springs 24 and the legs of the shackles 22. This mechanism, and especially the pins 50, comprise pivot means for the composite bed unit relative to the rearward end of the chassis 14.

For purposes of elevating the forward end of the composite bed unit 30, including both the subframe 32 and deck member 34, is a pair of longitudinally extendible fluid-operated pressure units 52 respectively mounted at opposite sides of the chassis 14, one end of said units being pivotally connected to depending members 54, shown in FIGS. 1 and 4-7, and the piston end of said units are pivotally connected to the forward end of subframe 32. The opposite ends of the pressure units 52 respectively are connected to sources of fluid under pressure, not shown, it being understood that a conventional pump or otherwise, not shown, supplies pressure fluid to the units and the control means for said fluid to render the units 52 expansible or contractable is mounted upon a convenient panel 56, carried, for example, by one side of the subframe 32, as best shown in FIGS. 1 and 2.

When the pressure units 52 are extended, the forward end of the bed unit 30 will be elevated about the pivot pins 50 to dispose said bed unit 30 at an angle to the exemplary supporting surface 58, shown in all of the figures except FIG. 2, the same being a roadway, pavement or otherwise.

As mentioned hereinabove, the deck member 34 is slidable longitudinally upon the subframe 32 and preferably is appreciably longer than said subframe as can be seen readily from FIG. 1. For purposes of projecting and contracting the deck member 34 with respect to the subframe, there is mounted upon the deck member 34, preferably between the channel members 42 thereof, a relatively long fluid-operated cylinder unit 60. The piston end thereof is pivotally connected to a clevis 62 mounted upon the transverse strut 40 connected to the ends of and extending transversely with respect to the parallel channel members 42 of the deck member. The opposite end of the unit 60 is pivotally connected to a transverse member 64 which extends between and is connected to the elongated channel members 44 of subframe 32. It will be understood that the opposite ends of the cylinder unit 60 are connected by means, not shown, to a source of fluid under pressure, not shown, and delivery of pressure fluid and removal thereof from the unit 62 is controlled by one of the control members 66 on the panel 56.

Figure 6:
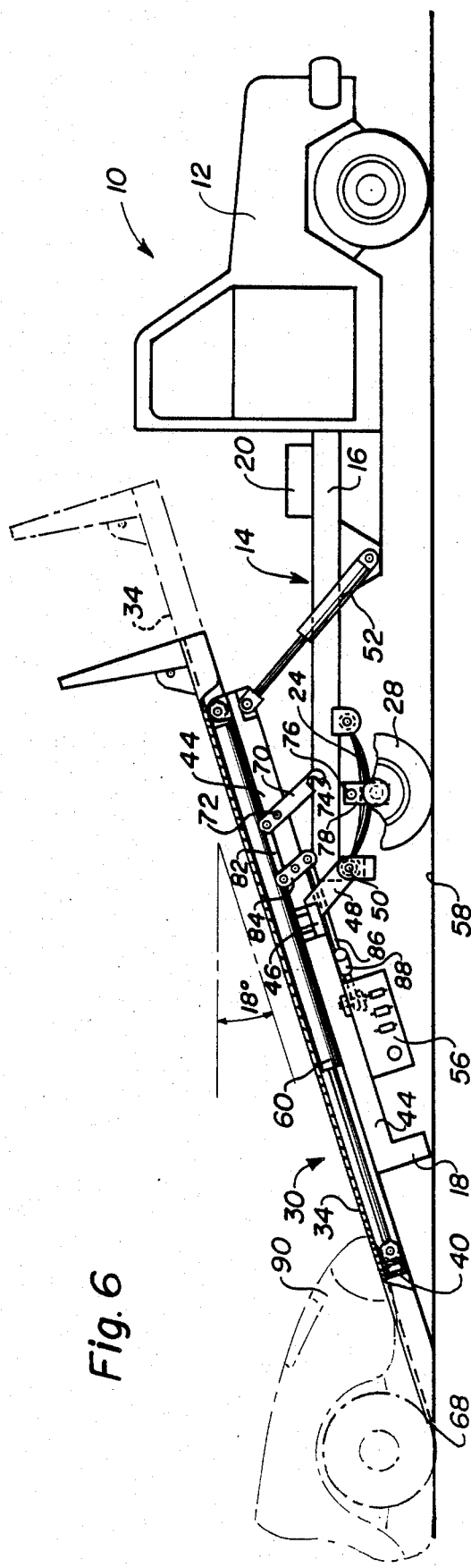
FIG. 6 is a side elevation partly in longitudinal section illustrating the deck unit being extended rearwardly to its fullest extent with the latching means disconnected and thereby disposing the upper surface of the deck member at an exemplary angle of 18°, said view also illustrating the forward end of the deck unit in phantom in its initial, nonprojected condition, and an exemplary end of a vehicle being illustrated in phantom adjacent the outermost end of the deck unit and in which said end of the vehicle has engaged the deck unit while the wheels are out of engagement.

For purposes of loading, as well as unloading, a vehicle upon the deck member 34 of the bed unit 30, said deck member preferably is extended to the maximum position, such as shown, for example, in FIG. 6. This is accomplished by means of energizing the cylinder unit 60, as well as the pair of cylinder units 52. Preferably, the rearmost edge 68 of the deck member 34 engages the supporting surface 58 under the foregoing circumstances.

Figure 7:
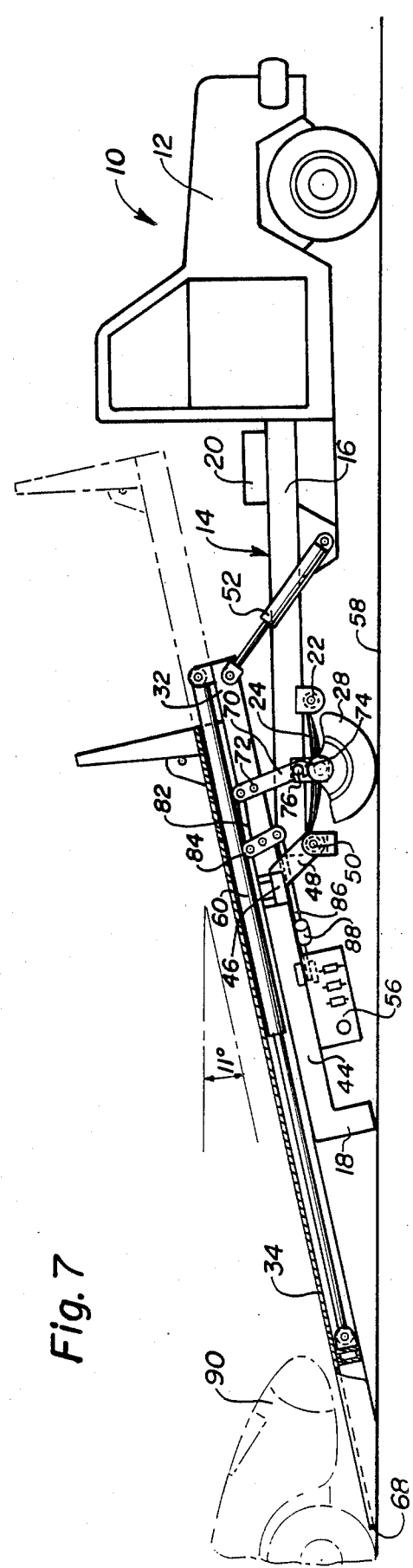
FIG. 7 is a view similar to FIG. 6 but showing the latch mechanism connected and the power means having tilted the deck unit to its fullest extent and thereby dispose the deck unit at an exemplary angle of 11° to the horizontal.

In order to decrease the angle at which the fully projected deck member 34 is disposed with respect to the horizontal, such as exemplified by the supporting surface 58, shown in FIGS. 6 and 7, one of the most important features of the present invention comprises a latch mechanism. The latch mechanism comprises latch members 70 respectively disposed at opposite sides of the chassis 16 and subframe 32, as shown in all of the figures. The latch members move about a pivot 72 which is affixed to the subframe 32 on the outer surfaces of each of the elongated channel members 44 thereof. The lower ends of the latch member 70 have a hook 74 formed therein which is extendible clockwise, as viewed in FIG. 4, for reception of a keeper 76 in the form of a lug, projecting outward, respectively at opposite sides of the chassis, from upstanding support members 78, affixed to and extending upward from adjacent portions of the housing 26 for the axles for the wheels 28. The pivot 72 for latch member 70 preferably comprises a rod 80 extending transversely through the opposite channel members 44 of subframe 32, and said members are securely fixed respectively to the opposite ends of said rod, whereby actuation of one latch member correspondingly operates the other.

The mechanism to operate the latch members 70 is relatively simple and comprises linkage in the form of a link 82, which extends between the upper end of one of the latch members 70 and the upper end of a transfer member 84, which is pivotally connected intermediately of its ends to channel members 44 of the subframe 32 and the lower end of transfer member 84 is connected to one end of an actuating rod 86, which actually is a link between the lower end of transfer member 84 and a manually-operated arm 88, positioned preferably adjacent the control 56 at one side of the chassis and actually connected to one of the channel members 44 of subframe 32.

When a vehicle is to be loaded upon the composite bed unit 30, and assuming that the same is in the position initially as shown in FIG. 1, the deck member 34 of said unit preferably is projected by actuating the cylinder unit 60 and either before or after this occurs, operating arm 88 is actuated to extend the hooks 74 of the latch member 70 into engagement with the keepers 76 comprising lugs fixed to said upstanding support member 78. To dispose the bed unit 30 at an angle with respect to the chassis 14, for example, pressure units 52 are energized by suitable manipulation of the control means on panel 56. As the pressure units 52 continue to expand, the unit 30 is pivoted about the pivot pins 50 and continued expansion of the units 52 results in the latches operating to depress the springs 24, and thereby bring the housing which supports the axles of the wheels 28 closer to the chassis 14, and this results in lowering the pivot pins 50 with respect to the supporting surface 58 and thereby decreases the angle between the extended deck member 34 and the horizontal or the supporting surface 58, as can be seen by comparing the disclosures, respectively, in FIGS. 6 and 7. It will be noted that in FIG. 6, the latch members 70 are not in engagement with the keepers 76, while in FIG. 7, they are in engagement with such keepers, and the phenomenon just described occurs. Further to illustrate such beneficial action, an exemplary angle is indicated at 18° in FIG. 6, which is the angle between the unlatched deck member and the horizontal, whereas in FIG. 7, the exemplary angle is indicated at 11°, thus effecting a decrease of 7° between the angles and this results in the distinct advantage of accommodating the overhanging end 90 of a vehicle which, as shown in FIG. 7, is still spaced from the upper surface of the deck member 34 while the wheel of the vehicle is about to engage said member, while in FIG. 6, the overhanging end 90 of the vehicle is in engagement with the upper surface of the deck member 34, while the wheel of the vehicle is not in firm engagement with the outermost end 68 of the deck member 34. It is to be understood that the exemplary angles referred to hereinabove are somewhat arbitrary and presented primarily for purposes of illustration, the essential advantage of the invention being that the latch arrangement afforded by the present invention results in appreciable reduction of the angle between the extended and sloping supporting member of a transport truck as distinguished from the angle which occurs when no such latching means or equivalent mechanism of the present invention is not present.

By reverse movements of the cylinder unit 60 and pressure units 52 from those described above, the deck member 34 is retracted to its initial position and the composite bed unit 30 is restored to its initial horizontal position upon the chassis 14. Assuming that a vehicle has been loaded upon the deck member 34 while in its extended sloping position, said vehicle then will be supported in loaded position upon the bed unit 30 when in horizontal position. For completeness, the unit 30 also may be provided with a winch unit 92 at the forward end of the unit 30.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. A truck adapted to transport at least automotive vehicles upon a bed movably disposed between a horizontal position and at a minimum angle to the horizontal, said truck comprising in combination, a substantially horizontal chassis extending rearward from a cab and having rear wheels connected to the rearward portion of the chassis by means of conventional compressible springs, a vehicle supporting deck unit at least as long as said chassis extending longitudinally therealong rearwardly from said cab, pivot means connecting said deck unit intermediately of its ends to a portion of the rearward end of said chassis, expansible power means connected pivotally at one end to said chassis forwardly of the rear wheels and at the other end connected pivotally to a portion of the chassis forwardly of said rear wheels, and at least one pivotally movable hook-like latch and a keeper engageable by said latch and operable to interconnect said chassis to said rear wheels, said latch being pivotally connected to either said chassis or rear wheels and said keeper being connected to the other, whereby said power means when energized to elevate the forward end of said deck unit about said pivot therefor on said chassis disposes said deck unit and chassis at a minimum acute angle to the horizontal and also disposes the rearward end thereof in engagement with the ground, and continuous expansion of said power unit operates to compress said compressible springs and thereby lower the deck unit with respect to the ground and thereby render the angle of the deck unit at a decreased angle to the horizontal compared to such angle developed when said latch is not employed.

2. The truck according to claim 1 in which said latch is pivotally connected to said chassis and said keeper is affixed to housing means for the axles of said rear wheels.

3. The truck according to claim 1 further including means to operate said latch.

4. The truck according to claim 3 in which said means to operate said latch comprises a pivoted manually-operated lever.

5. The truck according to claim 1 in which said truck further includes a housing containing an axle to which said rear wheels are connected, and said keeper comprising lug means affixed to said housing and engageable by said hook-like latch when said deck unit is in normal position upon said chassis.

6. The truck according to claim 1 in which said hook-like latch and a keeper is duplicated on opposite sides of said truck.

7. The truck according to claim 1 in which operating means for said hook-like latch and a keeper is connected to one side of said truck chassis and said hook-like latch and a keeper at opposite sides of said truck chassis are interconnected to said operating means for simultaneous operation of said opposite latch mechanisms.

8. The truck according to claim 1 in which said deck unit is composite and comprises a subframe mounted upon the upper portion of said chassis and a deck member superimposed upon said subframe and slidable longitudinally upon the upper surface of said subframe, and power means interconnected at opposite ends thereof respectively to said subframe and deck member and operable to move said deck member longitudinally along said subframe between extended and retracted positions.

9. The truck according to claim 8 in which said power means comprises a fluid-operated cylinder unit supported between opposite sides of said deck member beneath the upper surface thereof.

10. The truck according to claim 8 in which said subframe is pivotally connected to said chassis adjacent the rearward end thereof and said pivot being substantially midway between opposite ends of said subframe.

11. The truck according to claim 8 in which said deck member is of greater length than said subframe and when in retracted position upon said subframe and chassis the rear end of said deck member extends outwardly beyond said subframe a predetermined amount of distance to maximize vehicle-supporting space upon said deck member.

12. The truck according to claim 11 wherein the lower surface of the rearward end of said deck member is tapered upward and outward to permit the rear terminal end of said deck member to engage a pavement surface or the like when said deck unit is disposed at a predetermined minimum angle to the horizontal.

13. The truck according to claim 1 in which said pivotally movable hook-like latch and a keeper comprise similar hook-like latch members pivotally connected to said deck unit respectively at opposite sides thereof and engageable with lug members interconnected to opposite end portions of a housing for the axles of said rear wheels, means interconnecting said latch members for simultaneous operation, and means adjacent one side of said chassis arranged to operate said latch members between connected and disconnected positions relative to said lug members.

14. A truck for transporting vehicles and including in combination, a chassis, a deck unit pivotally-connected to the rear end of said chassis, compressible spring means connecting housings for the rear wheel axles to said chassis, fluid-operated members connected at opposite ends respectively to said chassis forwardly of said rear wheels and to a forward portion of said deck unit and operable to move the forward end of said deck unit between a retracted position upon said chassis and an elevated position wherein said deck unit is in sloping position and the rearward end of said deck unit is adjacent a pavement surface or the like to receive a vehicle upon said deck unit, in combination with interconnectable hook-like latch means and and keepers interconnectable between said axle housing and said deck unit, whereby with the latch means connected to the keepers upon continued expansion of said fluid-operated members said spring means are compressed and said pivot for said deck unit is lowered and thereby the deck unit is disposed at a decreased acute angle to said pavement or the like to facilitate loading a vehicle thereonto.

15. The truck according to claim 14 in which said deck unit is composite and comprises a subframe which is pivotally connected to the rear end of said chassis and slidably supports a planar deck member upon the upper surface of said subframe, fluid-operated means operable to project and retract said deck member relative to said subframe, and manually-operable control means for said fluid-operated means for raising and lowering the forward end of said deck unit and for projecting and retracting said deck member relative to said sub-frame located adjacent one side of said deck unit.

16. The truck according to claim 14 further including adjacent one side of said deck unit a manually-operable lever mechanism to actuate said latch means.

* * * * *